(12) United States Patent
Martinovski

(10) Patent No.: US 11,858,498 B2
(45) Date of Patent: Jan. 2, 2024

(54) AUTONOMOUS VEHICLE LOADING WITH SMART TRANSPORTATION PLATFORMS

(71) Applicant: Ford Global Technologies, LLC, Dearborn, MI (US)

(72) Inventor: Oliver Martinovski, Shelby Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 67 days.

(21) Appl. No.: 17/514,612

(22) Filed: Oct. 29, 2021

(65) Prior Publication Data

US 2023/0138468 A1    May 4, 2023

(51) Int. Cl.
*B60W 30/06* (2006.01)
*B60W 60/00* (2020.01)

(52) U.S. Cl.
CPC ........ *B60W 30/06* (2013.01); *B60W 60/0025* (2020.02); *B60W 2540/215* (2020.02)

(58) Field of Classification Search
CPC ............. B60W 30/06; B60W 60/0025; B60W 2540/215; B62D 15/0285
See application file for complete search history.

(56) References Cited

U.S. PATENT DOCUMENTS

| | | | |
|---|---|---|---|
| 2013/0250046 A1 | 9/2013 | Schofield et al. | |
| 2017/0329346 A1* | 11/2017 | Latotzki | G08G 1/164 |
| 2017/0355295 A1* | 12/2017 | Gutowitz | B60K 1/00 |
| 2018/0170365 A1* | 6/2018 | Shani | B60W 30/06 |
| 2019/0233034 A1 | 8/2019 | Viele et al. | |
| 2019/0302764 A1* | 10/2019 | Smith | B62D 53/125 |
| 2019/0389359 A1* | 12/2019 | Liburdi | G05D 1/0088 |
| 2020/0257910 A1* | 8/2020 | Mayer | G08G 1/0129 |
| 2021/0046988 A1 | 2/2021 | Bean et al. | |
| 2021/0155230 A1* | 5/2021 | Brown | H04W 4/46 |

(Continued)

FOREIGN PATENT DOCUMENTS

| | | | |
|---|---|---|---|
| CN | 104699103 A | 6/2015 | |
| CN | 111186357 A | 5/2020 | |

OTHER PUBLICATIONS

Berry Gerrits, Multi-agent system design for automated docking of semi-trailers by means of autonomous vehicles, Industrial Engineering an d Business Information Systems, Dec. 4, 2016, 1-124.

(Continued)

*Primary Examiner* — Abby Y Lin
*Assistant Examiner* — Danielle Marie Jackson
(74) *Attorney, Agent, or Firm* — Brandon Hicks; Eversheds Sutherland (US) LLP

(57) ABSTRACT

Autonomous vehicle trailer loading with smart trailer are disclosed herein. An example method includes receiving a request to activate a self-loading procedure for an autonomous vehicle, executing the self-loading procedure by an autonomous vehicle controller, the self-loading procedure including causing the autonomous vehicle to navigate to a transportation platform, determining a visual identifier of the transportation platform using output from a sensor platform of the autonomous vehicle, and causing the autonomous vehicle to navigate onto or into the transportation platform and park at a parking spot of the transportation platform designated for the autonomous vehicle.

20 Claims, 5 Drawing Sheets

(56) References Cited

U.S. PATENT DOCUMENTS

2021/0394746 A1* 12/2021 Matsushita ............ G08G 1/168
2022/0001857 A1*  1/2022 Hamada ................ B60W 30/06

OTHER PUBLICATIONS

Xiaodi Kang et al., Vehicle-Trailer Handling Dynamics and Stability Control—an Engineering Review, SAE Technical Paper Series, SAE International, Vehicle Dynamics & Simulation, 2007 (SP-2138), 1-10.

* cited by examiner

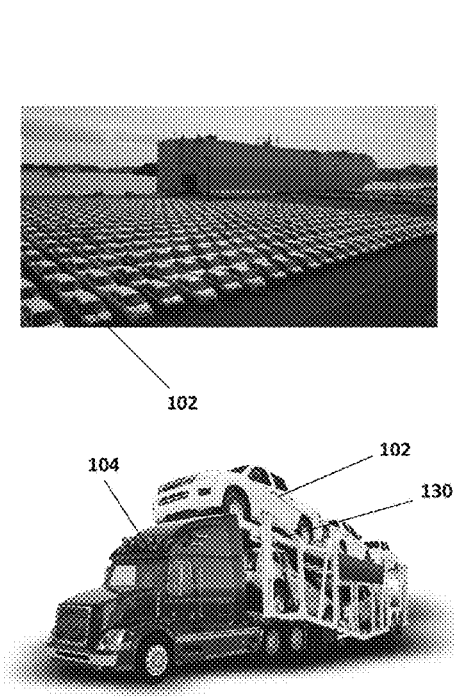
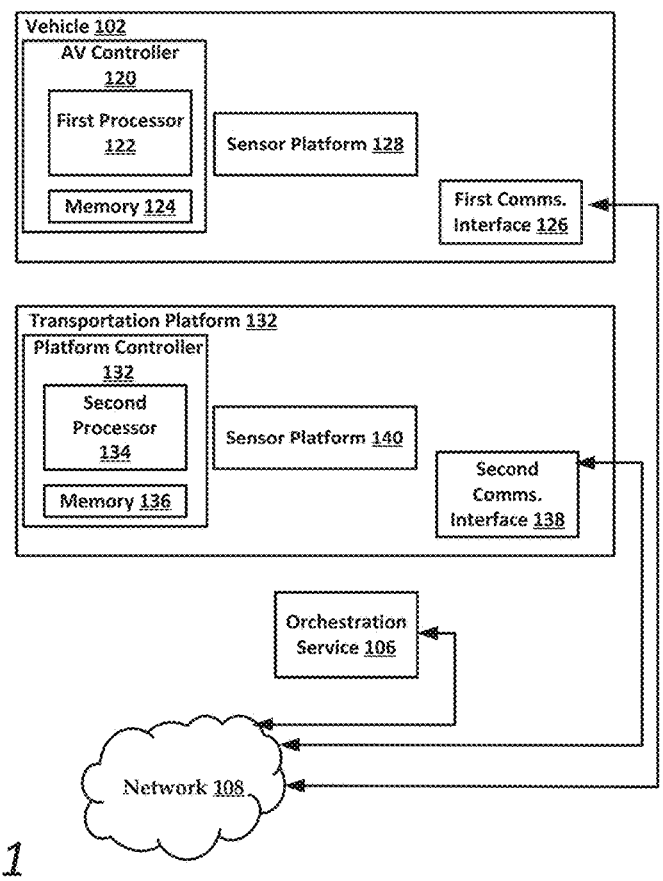
FIG. 1

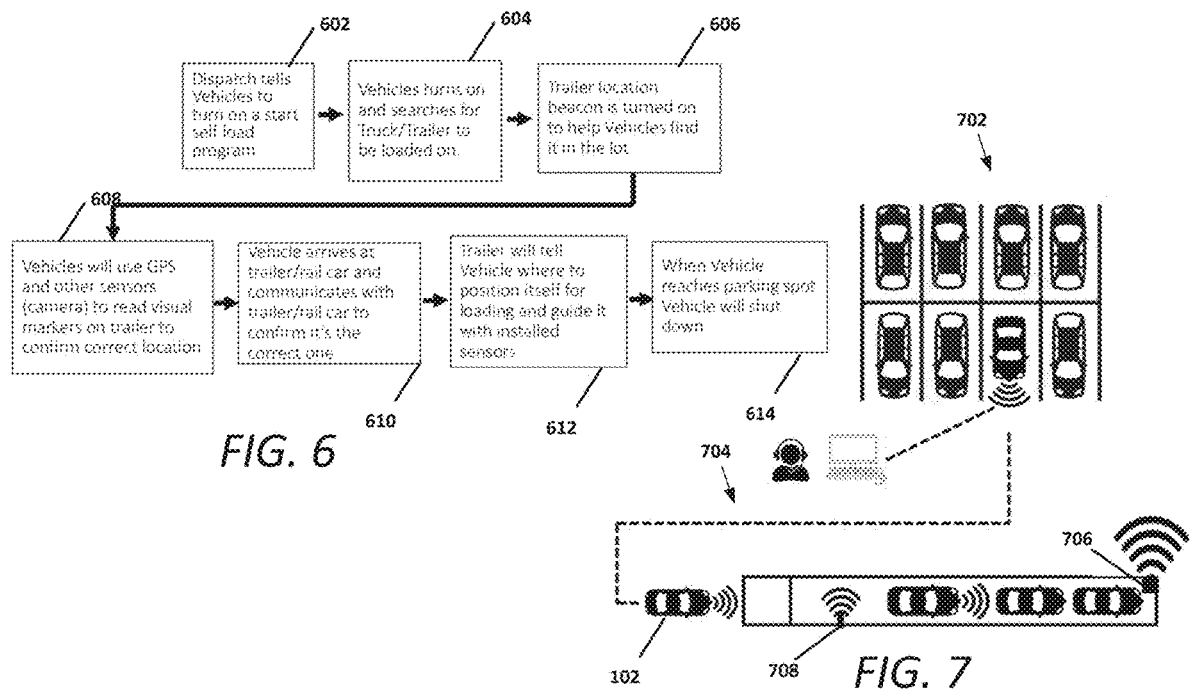

AUTONOMOUS VEHICLE LOADING WITH SMART TRANSPORTATION PLATFORMS

BACKGROUND

A vehicle can be damaged during transportation of the vehicle from one location to another. Top causes for vehicle damage in transit include weather and transport-related damage due to carelessness or accidents. Loading vehicles onto transportation platforms, such as rail cars, shipping containers, trailers, and the like is a delicate process. When errors occur during these loading procedures, vehicle damage may occur, as well as damage to the transportation platform. Additionally, loading vehicles precisely, without damage for shipment to dealerships or customers requires excessive manpower and time.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 1 illustrates an example architecture where the systems and method of the present disclosure may be practiced.

FIG. 2 is a flowchart of the method that is schematically illustrated in FIG. 3.

FIG. 4 is a flowchart of the method that is schematically illustrated in FIG. 5.

FIGS. 6 and 7 collectively illustrate a method involving an autonomous vehicle loading scenario. FIG. 6 is a flowchart of the method that is schematically illustrated in FIG. 7.

DETAILED DESCRIPTION

Overview

Figure 2:
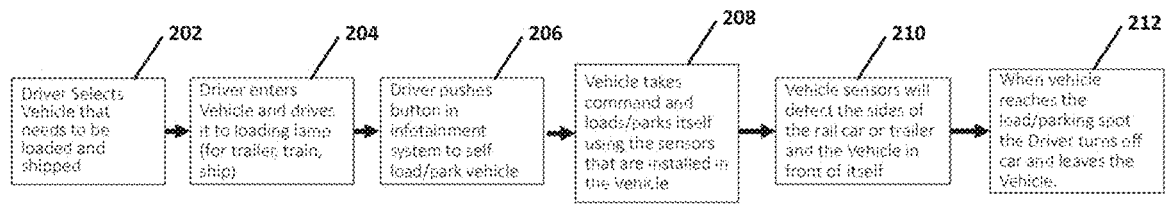
FIGS. 2 and 3 collectively illustrate a method involving a semi-autonomous vehicle loading scenario.

The present disclosure pertains to autonomous vehicle loading with smart transportation platforms, as well as methods of use. Disclosed is the use of autonomous vehicle capabilities (either semi-autonomous or fully autonomous) to improve vehicle loading accuracy and throughput and to mitigate damage to the vehicle in which items are being loaded.

In one example scenario, a process to load a vehicle autonomously with a driver inside may involve the driver selecting the vehicle that needs to be loaded and shipped. The driver enters the vehicle and drives it to a transportation platform (could be a trailer, train, ship, or the like). The driver can actuate a self-loading system of the vehicle. For example, the driver can select a button provided through an infotainment system of the vehicle to initiate a self-load/park procedure for the vehicle. In response, an autonomous vehicle controller can assume command and cause the vehicle to load/park using the sensors that are installed in the vehicle. For example, vehicle sensors can be used to detect the sides of the rail car or trailer and adjacent vehicles (such as another vehicle in front of itself). When the vehicle reaches the load/parking spot, the driver turns off the vehicle and leaves the vehicle.

A first process to load the vehicle autonomously onto a transportation platform without the driver inside (a driver can be present if desired) can include a dispatch service creating an electronic loading schedule. The electronic schedule can include specifying an assignment of cars to the transportation platform, which can be defined by GPS location information. An identifier for the transportation platform can also be included. Dispatch connects to vehicles over a network connection (could be long or short-range). Vehicles can autonomously navigate the defined location to be loaded according to the schedule provided by dispatch. An autonomous controller of the vehicle can use GPS and other sensors (camera) to read visual markers on the transportation platform to confirm that the vehicle is in the correct location.

In one example, a staging coordinator, such as a human, can confirm that the subject vehicle is the correct vehicle to be loaded onto a transportation platform. The staging coordinator may push a button on the infotainment system to have the vehicle self-load/park. Vehicle sensors can detect the sides of the transportation platform and the vehicle in front of itself during autonomous movement. When the vehicle reaches a designated parking spot, the vehicle may then shut down automatically. In another example, verification by the staging coordinator is not required and the vehicle can initiate a self-load/park.

A second process to load the vehicle autonomously without the driver inside can involve dispatch transmitting instructions a vehicle to initiate on a start self-load program. The vehicle turns on and searches for an assigned transportation platform using coordinates provided in the instructions. The vehicle can autonomously navigate to a general location of the transportation platform using the coordinates.

A location beacon can be activated on the transportation platform to help vehicles find the transportation platform. The vehicle controller can use GPS and other sensors (camera) to read visual markers on the transportation platform to confirm the correct location. The vehicle arrives at the transportation platform and communicates with a controller on the transportation platform car to verify that the vehicle is at the correct transportation platform. The transportation platform can transmit instructions to the vehicle where to position itself for loading and guide it with installed sensors. When the vehicle reaches the parking spot the vehicle can shut down.

Illustrative Embodiments

Turning now to the drawings, FIG. 1 depicts an illustrative architecture 100 in which techniques and structures of the present disclosure may be implemented. The architecture 100 includes a vehicle 102, a transportation platform 104, an orchestration service 106, and a network 108.

Some or all of these components in the architecture 100 can communicate with one another using the network 108. The network 108 can include combinations of networks that enable the components in the architecture 100 to communicate with one another. The network 108 may include any one or a combination of multiple different types of networks, such as cellular, cable, the Internet, wireless networks, and other private and/or public networks. The network can include both short and long-range wireless networks.

In one scenario, the vehicle 102 is can be operated fully- or semi-autonomously. For example, the vehicle 102 can operate fully autonomously when no driver is present. The vehicle 102 can be operated in a semi-autonomous manner when a user is present in the vehicle. As will be discussed, a user can drive the vehicle 102 and remain present until an autonomous loading and parking procedure is complete. This allows the user to remain in control of the vehicle in case of an emergency, such as when the autonomous function of the vehicle errs. In other instances, the vehicle 102 can be configured to operate entirely without user involvement. For example, the vehicle 102 can include autonomous features that interact with the transportation platform 104 and/or the orchestration service 106 to successfully load the vehicle 102 onto the transportation platform 104 in a designated space, as will be discussed in various use cases herein.

The vehicle can comprise an autonomous vehicle (hereinafter AV controller 120) that can include a processor 122 and memory 124. The processor 122 executes instructions stored in memory 124 to perform the functions and methods attributed to the vehicle 102. When referring to actions performed by the vehicle 102, the AV controller 120, and/or the processor 122, this includes the execution of instructions by the processor 122 stored in memory 124. A communications interface 126 can be used by the processor 122 to transmit and/or receive data over the network 108.

The vehicle 102 can comprise a sensor platform 128 can include sensors directed to attachment sites on the vehicle 102. The sensor platform 128 can include various include sensors mounted on the vehicle, such as cameras, LIDAR (light imaging and ranging), IR (infrared), ultrasonic, location sensing (such as GPS), and the like. The AV controller 120 can be configured to receive and process signals or other data from each of the individual sensors of the sensor platform 128 to assist in performing any of the autonomous or semi-autonomous vehicle loading and/or parking procedures disclosed herein.

The transportation platform 104 can include any suitable structure that is capable of receiving one or more vehicles for transportation. For example, the transportation platform 104 can include a storage container, a trailer, a ship, or other similar platforms. In general, the vehicle 102 can be loaded onto the transportation platform 104 for subsequent transportation to a delivery location. In one example, the transportation platform 104 can include a truck and trailer that includes multiple slots or parking spots where the vehicle 102 can be located during transportation.

The transportation platform 104 includes a physical structure that supports the vehicle 102. A trailer can include rails or other ramps used to support the vehicle. The vehicle can be driven onto the trailer and secured for transport. During loading, care is taken to ensure that the vehicle does not drive off of the rails or other ramps, which may damage the vehicle. In another example, the transportation platform 104 could include a shipping container with sidewalls. The vehicle can be driven into the shipping container and secured for transport, making sure that during the loading process, a distance between the sidewalls and the vehicle is maintained to avoid vehicle and/or transportation platform 104. In another example, the transportation platform 104 could include a ferry or ship that has a plurality of parking spots located on a deck or level of the ship. The vehicle can be driven into a specific parking sport and secured for transport, making sure that during the loading process the vehicle does not impact other vehicles. In general, in any loading process where more than one vehicle is loaded on the transportation platform 104, care should be taken to ensure that the vehicle does not hit another vehicle being transported on the same transportation platform. As a general matter, any loading procedure for the vehicle onto a transportation platform can involve ensuring that the vehicle avoids damage due to improper loading, be it from the vehicle being improperly driven onto the transportation platform, the vehicle hitting a structure of the transportation platform, and/or the vehicle hitting another vehicle.

The transportation platform 104 can comprise a parking spot 130 for the vehicle 102. As noted above, the transportation platform 104 can include a plurality of parking spots for multiple vehicles. The transportation platform 104 can also comprise a transportation platform controller (hereinafter platform controller 132), which can include a processor 134 and memory 136. The processor 134 executes instructions stored in memory 136 to perform the functions and methods attributed to the transportation platform 104. When referring to actions performed by the transportation platform 104, the platform controller 132, and/or the processor 134, this includes the execution of instructions by the processor 134 stored in memory 136. A communications interface 138 can be used by the processor 134 to transmit and/or receive data over the network 108. The transportation platform 104 can also include a sensor platform 140. The sensor platform 128 can include various include sensors mounted on the vehicle, such as cameras, LIDAR (light imaging and ranging), IR (infrared), ultrasonic, location sensing (such as GPS), and the like. Examples of transportation platform sensors will be described in various use cases below.

The orchestration service 106 can function as a dispatch service that orchestrates processes used in the loading of the vehicle 102 onto the transportation platform 104. The orchestration service 106 can include a server or cloud that is programmed to provide vehicle loading and logistics methods disclosed herein. The orchestration service 106 can communicate with the vehicle 102 and/or the transportation platform 104 over the network 108 using any combination of hardware and/or software that would be known to one of ordinary skill in the art.

In order to elucidate various vehicle loading methods enabled by the present disclosure, various scenarios are provided herein. Each of these scenarios is disclosed in flowchart format in FIGS. 2-7. The scenarios will be discussed individually. It will be understood that these scenarios are provided for purposes of exemplifying use cases where the systems and methods can be deployed. These examples are not intended to be limiting.

Figure 3:
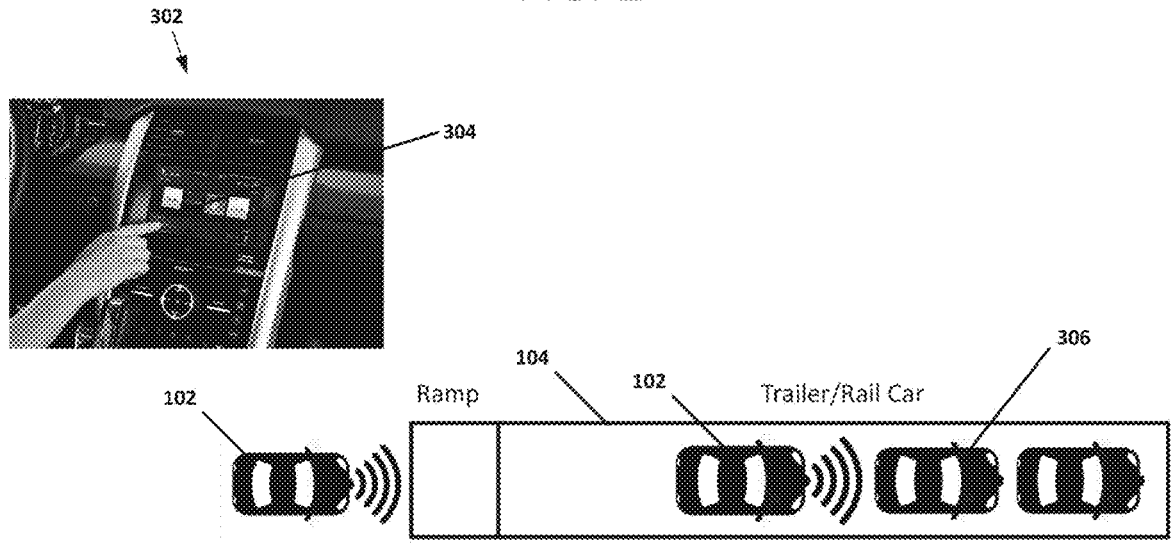

FIGS. 2 and 3 collectively illustrate a method involving a semi-autonomous vehicle loading scenario. FIG. 2 is a flowchart of the method that is schematically illustrated in FIG. 3. It will be understood that some references to FIG. 1 may be included for context. The method includes the vehicle 102 (which includes a vehicle with autonomous driving capabilities) being loaded onto the transportation platform 104. In this particular implementation, the transportation platform 104 is a trailer that includes parking spots for several vehicles. In general, the method includes a step 202 of a driver identifying the vehicle 102 as a vehicle that requires loading onto the trailer of the transportation platform 104. The driver could be provided with a list of vehicles from the orchestration service 106, for example. The driver can enter the vehicle 102 and drive it onto a ramp of the trailer in step 204. The driver can activate the self-loading procedure by selecting a button 302 on a human-machine interface (HMI 304) of the vehicle 102 in step 206. This self-loading procedure can be activated when the vehicle is on the trailer or before the vehicle is drive up the ramp and onto the trailer.

When activated, the AV controller 120 (see FIG. 1) may take over the remainder of the loading procedure by activating sensors of the sensor platform 128 (also see FIG. 1) in step 208. For example, the AV controller 120 can activate cameras positioned on the vehicle 102 to obtain images of the trailer. Using image processing, the AV controller 120 can detect a driving path for the vehicle 102 that is converted into instructions used to autonomously navigate the vehicle 102 into position. For example, the AV controller 120 can use images to detect the edges of the ramp or rails, as well as adjacent vehicles (such as adjacent vehicle 306) in step 210. The AV controller 120 can cause the vehicle 102 to remain on these structures as it drives onto the trailer into the assigned spot. In some instances, the AV controller 120 can navigate the vehicle to a specific location on the transportation platform. For example, each spot on the trailer may be identified using a visual indicator, such as an icon, quick response (QR) code, barcode, or the like. The AV controller 120 can scan for the relevant visual indicator using camera images. When the vehicle arrives at its designated spot, the driver can turn off the engine in step 212. In other instances, the AV controller 120 can turn off the vehicle engine when the designated spot has been reached.

During parking, the AV controller 120 can also use proximity sensors to maintain a specified distance between the vehicle 102 and an adjacent vehicle in front of it on the transportation platform. As noted above, if the driver is present, the driver can maintain control of the vehicle to ensure that it does not impact the transportation platform and/or any adjacent vehicles. If the transportation platform were to be a shipping container or rail car rather than a trailer, the AV controller 120 can use the output of vehicle sensors to detect sides of the rail car or trailer and the vehicle in front of itself.

Figures 4, 5:
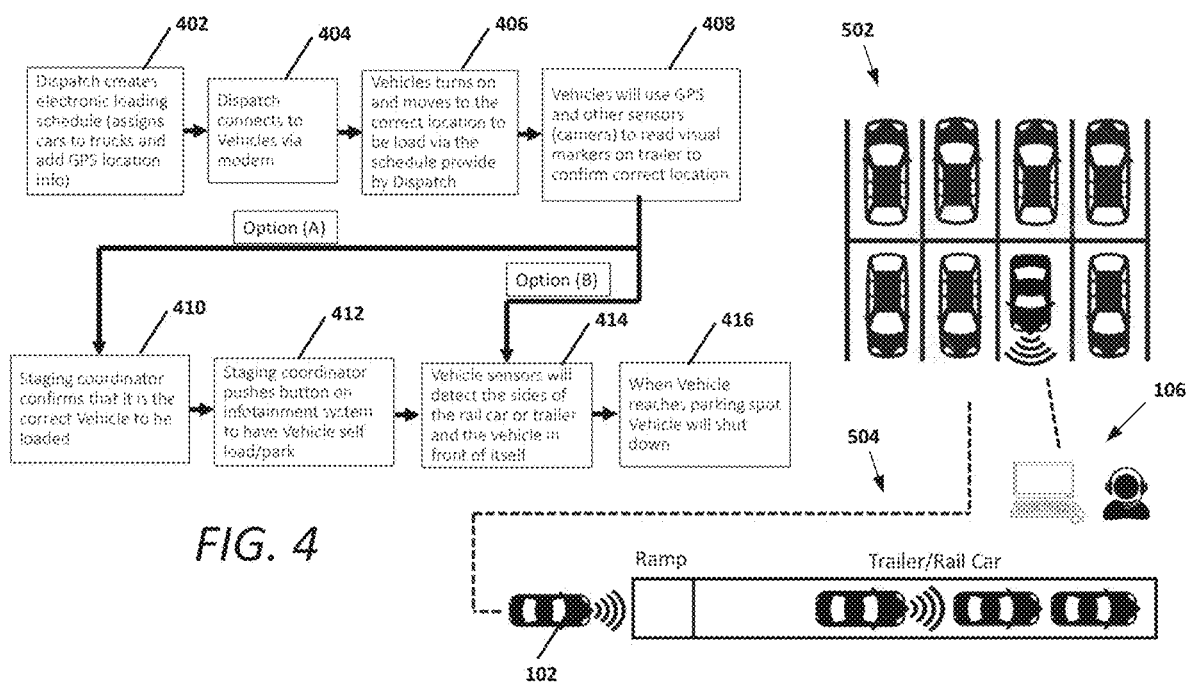
FIGS. 4 and 5 collectively illustrate a method involving a semi-autonomous vehicle loading scenario.

FIGS. 4 and 5 collectively illustrate a method involving a semi-autonomous vehicle loading scenario. FIG. 4 is a flowchart of the method that is schematically illustrated in FIG. 5. It will be understood that some references to FIG. 1 may be included for context. In general, the scenario depicted involves a dispatch service (e.g., orchestration service 106) initiating a process for loading a vehicle onto a transportation platform. The orchestration service 106 can create an electronic loading schedule (assigns cars to transportation platforms and adds GPS location information for the transportation platforms) as in step 402. The orchestration service 106 transmits the loading schedule to vehicles or users in anticipation of vehicle loading in step 404.

In step 406, the AV controller 120 processes the loading schedule and activates the vehicle, causing it to autonomously navigate to a location of the assigned transportation platform (included in the loading schedule). In this example, the vehicle 102 is in a parking lot or other staging area 502 when it receives the loading schedule. The AV controller 120 causes the vehicle 102 to navigate a path 504 to the transportation platform 104. The vehicle can use GPS and other sensors (cameras) to read visual markers on the trailer to confirm that it is in the correct location for loading in step 408.

In one example method, a staging coordinator (which can be a human) confirms that the vehicle 102 is in the correct location and should be loaded onto the trailer in step 410. If confirmed, the method can include a step 412 of the staging coordinator pushing a button on the HMI of the vehicle to initiate an autonomous loading procedure.

In an alternative method, which does not involve the staging coordinator, the method bypasses steps 410 and 412. As noted above, the AV controller 120 may execute the loading procedure by activating sensors of the sensor platform 128 as in step 414. For example, the AV controller 120 can activate cameras positioned on the vehicle 102 to obtain images of the trailer. Using image processing, the AV controller 120 can detect a driving path for the vehicle 102 that is converted into instructions used to autonomously navigate the vehicle 102 into position. For example, the AV controller 120 can use images to detect the edges of the ramp or rails, as well as adjacent vehicles. The AV controller 120 can cause the vehicle 102 to remain on these structures as it drives onto the trailer into the assigned spot. In some instances, the AV controller 120 can navigate the vehicle to a specific location on the transportation platform. For example, each spot on the trailer may be identified using a visual indicator, such as an icon, quick response (QR) code, barcode, or the like. The AV controller 120 can scan for the relevant visual indicator using camera images. When the vehicle arrives at its designated spot, the driver can turn of the engine in step 416. In other instances, the AV controller 120 can turn off the vehicle engine when the designated spot has been reached.

During parking, the AV controller 120 can also use proximity sensors to maintain a specified distance between the vehicle 102 and an adjacent vehicle in front of it on the transportation platform. As noted above, if the driver is present, the driver can maintain control of the vehicle to ensure that it does not impact the transportation platform and/or any adjacent vehicles. If the transportation platform were to be a shipping container or rail car rather than a trailer, the AV controller 120 can use the output of vehicle sensors to detect sides of the rail car or trailer and the vehicle in front of itself.

FIGS. 6 and 7 collectively illustrate a method involving an autonomous vehicle loading scenario. FIG. 6 is a flowchart of the method that is schematically illustrated in FIG. 7. It will be understood that some references to FIG. 1 may be included for context. In contrast with the method and schematic of FIGS. 4 and 5, this process is fully automated, allowing the vehicle to load without human intervention after dispatch.

In general, the scenario depicted involves a dispatch service (e.g., orchestration service 106) initiating a process for loading a vehicle onto a transportation platform. The orchestration service 106 can create an electronic loading schedule (assigns cars to transportation platforms and adds GPS location information for the transportation platforms). The orchestration service 106 transmits the loading schedule to vehicles or users in anticipation of vehicle loading in step 602.

In step 604, the AV controller 120 processes the loading schedule and activates the vehicle, causing it to autonomously navigate to a general location of the assigned transportation platform (included in the loading schedule). In this example, the vehicle 102 is in a parking lot or other staging area 702 when it receives the loading schedule. The AV controller 120 causes the vehicle 102 to navigate a path 704 to a general location where the transportation platform 104 is located. The transportation platform 104 can comprise a beacon 706 that can be activated in step 606 and used to broadcast identifying information. That is, a trailer location beacon can be used to help vehicles find the transportation platform in a lot or other location. The AV controller 120 receives the signals from the beacon 706 over the air (e.g., using short-range wireless communications) and uses these signals to home in on the exact location of the transportation platform (the beacon signals could also include an identifier of the parking spot that the vehicle will occupy during transportation). The AV controller 120 can continue to use sensor platform signals or output to navigate the vehicle to the transportation platform 104, following the beacon signals in step 608.

In one example method, when the vehicle arrives at the transportation platform 104 after following the beacon signals, the AV controller 120 can read visual indicators on the transportation platform 104 to confirm that the vehicle is at the correct location in step 610. Also, when the vehicle arrives at the transportation platform 104, the AV controller 120 can communicate with the platform controller 132 of the transportation platform 104 to verify that the vehicle is about to be loaded onto the correct transportation platform. The platform controller 132 can maintain a manifest or another electronic record of which vehicles are to be loaded. In one example, the AV controller 120 can transmit a vehicle identifier such as vehicle identification number (VIN) to the platform controller 132. The platform controller 132 can check the VIN against the manifest to confirm that the vehicle should be loaded.

The platform controller 132 can also maintain a schedule that indicates which vehicles should be loaded and in what order. If the vehicle 102 is attempting to load out of order, the platform controller 132 may transmit a signal or message to the AV controller 120 to indicate that the vehicle 102 should wait. For example, if the vehicle that is scheduled to be loaded before the vehicle 102 has not yet arrived or been loaded, the platform controller 132 can transmit a message to the AV controller 120. The AV controller 120 can cause the vehicle 102 to autonomously move to a holding location near the transportation platform 104 to wait for the other vehicle to load. When the other vehicle has been loaded, the platform controller 132 can transmit another message to the AV controller 120 to attempt autonomous/self-loading again. If the other vehicle does not arrive or cannot be loaded, the platform controller 132 can allow the vehicle 102 to load. This missing vehicle can be reported back to the orchestration service 106 by the platform controller 132 in a message transmitted over the network 108.

When it is confirmed for the vehicle 102 to self-load, the AV controller 120 may execute the loading procedure by activating sensors of the sensor platform 128 as in step 612. In one example, the platform controller 132 can tell the AV controller 120 where to position the vehicle for loading and guide the vehicle with installed sensors. For example, the transportation platform 104 can comprise sensor(s), such as a sensor 708, that emit signals that can be followed by the AV controller 120. The sensor 708 could include an ultrasonic sensor that emits an ultrasonic signal. The sensor platform of the vehicle 102 can include a receiver that receives the ultrasonic signals. The AV controller 120 aligns the receiver with the ultrasonic signal emitted by the sensor 708 when navigating the vehicle 102. When the vehicle arrives at its designated spot, the driver can turn of the engine in step 614. In other instances, the AV controller 120 can turn off the vehicle engine when the designated spot has been reached.

As with other methods, during parking, the AV controller 120 can also use proximity sensors to maintain a specified distance between the vehicle 102 and an adjacent vehicle in front of it on the transportation platform. As noted above, if the driver is present, the driver can maintain control of the vehicle to ensure that it does not impact the transportation platform and/or any adjacent vehicles. If the transportation platform were to be a shipping container or rail car rather than a trailer, the AV controller 120 can use the output of vehicle sensors to detect sides of the rail car or trailer and the vehicle in front of itself.

Figure 8:
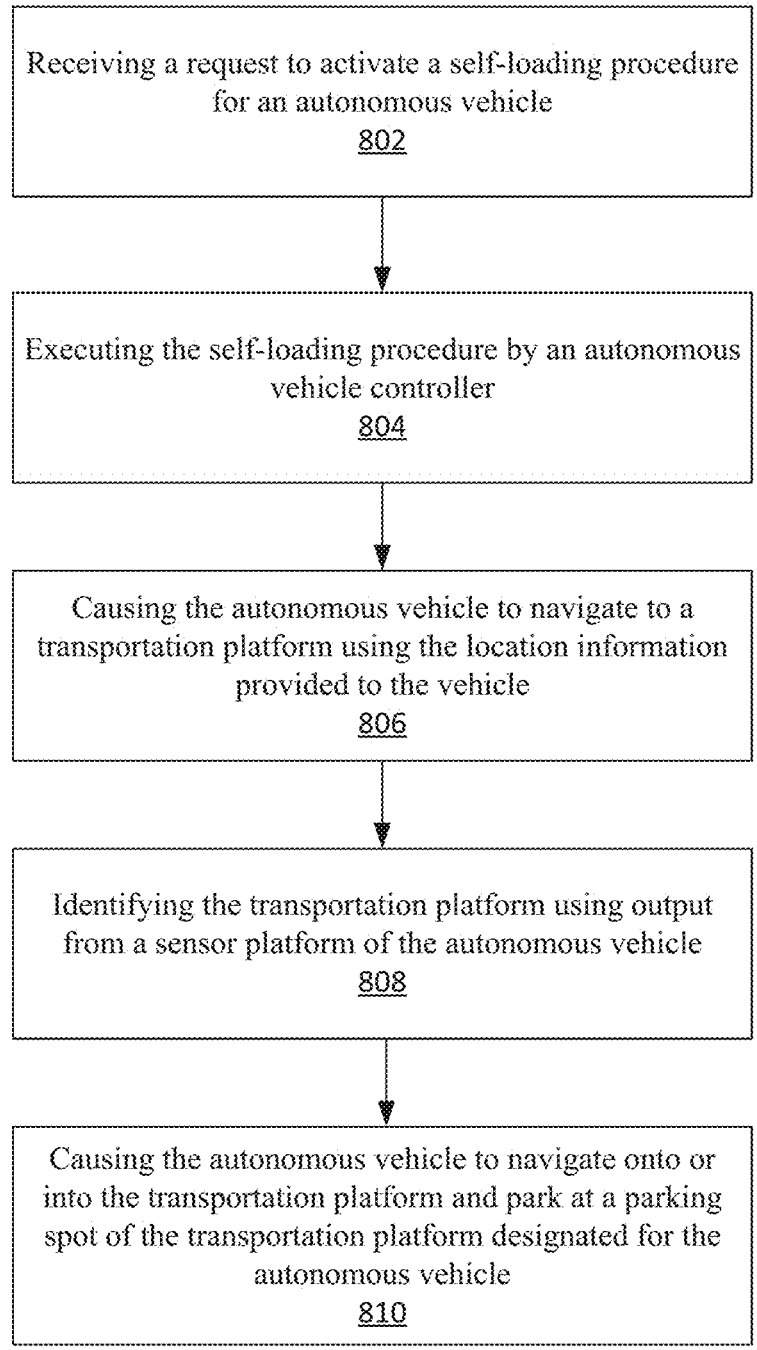
FIG. 8 is a flowchart of an example method of the present disclosure.

FIG. 8 is a flowchart of an example method. The method can include a step 802 of receiving a request to activate a self-loading procedure for an autonomous vehicle. As noted above, the request can be determined from user input obtained through a human-machine interface of the vehicle. In another example, the request can be determined from a dispatch service in a message transmitted over a network. The request can include GPS coordinates that identify a location of a transportation platform that the vehicle will be loaded onto for transport, such as a trailer, shipping container, or rail car—just to name a few. The request can also include information used by the vehicle to identify the transportation platform. This can include information that can be visually apprehended or read from a visual indicator placed on the transportation platform. In sum, the request or message from the dispatch service can comprise an identifier for the transportation platform and a location of the transportation platform. As noted above, rather than being transmitted by the dispatch service, the same information can be transmitted to the vehicle by a transportation platform controller.

The method can include a step 804 of executing the self-loading procedure by an autonomous vehicle controller. The self-loading procedure can involve a step 806 of causing the autonomous vehicle to navigate to a transportation platform using the location information provided to the vehicle.

Next, the method can include a step 808 of identifying the transportation platform using output from a sensor platform of the autonomous vehicle. For example, one method for identifying the transportation platform can include reading a visual indicator on the transportation platform. This could include a barcode or QR code printed somewhere on the trailer in a location that can be viewed by a camera of the vehicle. Once the vehicle confirms that it has arrived at the assigned transportation platform, the method can include a step 810 of causing the autonomous vehicle to navigate onto or into the transportation platform and park at a parking spot of the transportation platform designated for the autonomous vehicle.

In one configuration, if the vehicle inadvertently arrives at an incorrect location, a controller of the vehicle could be configured to broadcast a message to the transportation platform to begin beacon broadcasting (assuming the transportation platform has been so equipped). The transportation platform can cause its beacon to begin transmitting a signal used by the vehicle to home in on the transportation platform. This may be advantageous in instances where the GPS coordinates for the transportation platform are errant or when the transportation platform may be in a different location that was initially expected by the dispatch service when the vehicle was initially dispatched for loading onto the transportation platform.

This can include determining, by the autonomous vehicle controller using the output of the sensor platform, physical structures of the transportation platform such as a ramp, rails, sidewalls, or other physical structures. Next, the method can include navigating the autonomous vehicle into the parking spot in such a way as to avoid the autonomous vehicle contacting the physical structures and space the autonomous vehicle away from an adjacent autonomous vehicle.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method comprising:
    receiving a request to activate a self-loading procedure for an autonomous vehicle; and
    executing the self-loading procedure by an autonomous vehicle controller, the self-loading procedure comprising:
        causing the autonomous vehicle to navigate to a transportation platform;
        identifying the transportation platform using output from a sensor platform of the autonomous vehicle, wherein the output is indicative of a presence of a parking spot located on or in the transportation platform, and wherein the parking spot is designated for the autonomous vehicle; and
        causing the autonomous vehicle to navigate onto or into the transportation platform and park at the parking spot.

2. The method according to claim 1, further comprising determining the request from user input obtained through a human-machine interface of the autonomous vehicle.

3. The method according to claim 1, further comprising determining the request from an orchestration service.

4. The method according to claim 1, further comprising transmitting the request by an orchestration service, the request comprising an identifier for the transportation platform and a location of the transportation platform.

5. The method according to claim 1, further comprising transmitting the request by a transportation platform controller, the request comprising an identifier for the transportation platform and a location of the transportation platform.

6. The method according to claim 1, further comprising receiving verification that the autonomous vehicle has arrived at the transportation platform from a shipper agent.

7. The method according to claim 1, wherein causing the autonomous vehicle to navigate onto or into the transportation platform comprises:
    determining, by the autonomous vehicle controller using the output of the sensor platform, physical structures of the transportation platform; and
    navigating the autonomous vehicle onto or into the parking spot in such a way as to:
        avoid the autonomous vehicle contacting the physical structures; and
        space the autonomous vehicle away from an adjacent autonomous vehicle.

8. The method according to claim 1, further comprising receiving a location of the parking spot from a transportation platform controller when the autonomous vehicle arrives at the transportation platform.

9. An autonomous vehicle comprising:
    a sensor platform;
    an autonomous vehicle controller comprising a processor and memory for storing instructions, the processor executing the instructions to:
        cause the autonomous vehicle to navigate to a transportation platform;
        determine a visual identifier of the transportation platform using output from the sensor platform of the autonomous vehicle, wherein the visual identifier is associated with a parking spot located on or in the transportation platform, and wherein the parking spot is designated for the autonomous vehicle; and
        cause the autonomous vehicle to navigate onto or into the transportation platform and park at the parking spot.

10. The autonomous vehicle according to claim 9, wherein the processor is configured to receive a request to activate a self-loading procedure for the autonomous vehicle.

11. The autonomous vehicle according to claim 10, wherein the processor is further configured to receive the request from a human-machine interface of the autonomous vehicle.

12. The autonomous vehicle according to claim 10, wherein the processor is further configured to receive the request from a transportation platform controller, the request comprising an identifier for the transportation platform and a location of the transportation platform.

13. The autonomous vehicle according to claim 9, wherein the processor is configured to receive verification that the autonomous vehicle has arrived at the transportation platform from a shipper agent.

14. The autonomous vehicle according to claim 9, wherein the processor is configured to:
   determine, by the autonomous vehicle controller using the output of the sensor platform, physical structures of the transportation platform; and
   navigate the autonomous vehicle onto or into the parking spot in such a way as to:
      avoid the autonomous vehicle contacting the physical structures; and
      space the autonomous vehicle away from an adjacent autonomous vehicle.

15. The autonomous vehicle according to claim 9, wherein the processor is configured to receive a location of the parking spot from a transportation platform controller when the autonomous vehicle arrives at the transportation platform.

16. The autonomous vehicle according to claim 9, wherein the processor is configured to receive a request to activate a self-loading procedure for the autonomous from an orchestration service.

17. The autonomous vehicle according to claim 16, wherein the request comprises an identifier for the transportation platform and a location of the transportation platform.

18. A system comprising:
   an orchestration service;
   a transportation platform comprising parking spots for vehicles; and
   an autonomous vehicle comprising an autonomous vehicle controller having a processor and memory for storing instructions, the processor executing the instructions to:
      cause the autonomous vehicle to navigate to the transportation platform;
      determine a visual identifier of the transportation platform using output from a sensor platform of the autonomous vehicle, wherein the visual identifier is associated with a parking spot located on or in the transportation platform, and wherein the parking spot is designated for the autonomous vehicle; and
      cause the autonomous vehicle to navigate onto or into the transportation platform and park at the parking spot.

19. The system according to claim 18, wherein the transportation platform comprises a transportation platform controller that is configured to transmit a location of the transportation platform that is used by the autonomous vehicle to navigate to the transportation platform.

20. The system according to claim 18, wherein the transportation platform comprises a transportation platform controller that is configured to transmit a parking spot location of the parking spot to the autonomous vehicle.

* * * * *